US008093734B2

(12) United States Patent
Yuri

(10) Patent No.: US 8,093,734 B2
(45) Date of Patent: Jan. 10, 2012

(54) COGENERATION SYSTEM

(75) Inventor: Nobuyuki Yuri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 438 days.

(21) Appl. No.: 12/221,533

(22) Filed: Aug. 4, 2008

(65) Prior Publication Data

US 2009/0045626 A1    Feb. 19, 2009

(30) Foreign Application Priority Data

Aug. 17, 2007    (JP) .................................. 2007-212981

(51) Int. Cl.
| | |
|---|---|
| *F02D 29/06* | (2006.01) |
| *H02P 9/04* | (2006.01) |
| *B60L 1/02* | (2006.01) |
| *F01K 15/00* | (2006.01) |
| *F02C 6/00* | (2006.01) |

(52) U.S. Cl. ...... 290/40 C; 290/2; 290/40 R; 73/114.32; 701/29; 701/31

(58) Field of Classification Search ............ 290/2, 40 C, 290/40 R; 73/114.32; 701/29, 31
See application file for complete search history.

(56) References Cited

U.S. PATENT DOCUMENTS

| | | | | |
|---|---|---|---|---|
| 3,892,975 A | * | 7/1975 | Yannone et al. ........... | 290/40 R |
| 3,911,285 A | * | 10/1975 | Yannone et al. ........... | 290/40 R |
| 3,924,141 A | * | 12/1975 | Yannone et al. ........... | 290/40 R |
| 3,943,373 A | * | 3/1976 | Yannone et al. ........... | 290/40 R |
| 4,208,591 A | * | 6/1980 | Yannone et al. ........... | 290/40 R |
| 4,242,592 A | * | 12/1980 | Yannone et al. ........... | 290/40 R |
| 4,267,569 A | * | 5/1981 | Baumann et al. ............... | 701/99 |
| 4,283,634 A | * | 8/1981 | Yannone et al. ........... | 290/40 R |
| 4,308,463 A | * | 12/1981 | Giras et al. .................. | 290/40 R |
| 4,517,468 A | * | 5/1985 | Kemper et al. ................. | 290/52 |
| 4,601,199 A | * | 7/1986 | Denz .......................... | 73/114.25 |
| 4,739,482 A | * | 4/1988 | Wrigge ........................... | 701/30 |

(Continued)

FOREIGN PATENT DOCUMENTS

JP    01-237344    9/1989

OTHER PUBLICATIONS

Requisition of Canadian Intellectual Property Office on Application No. 2,638,727; titled "Cogeneration System"; dated Sep. 2, 2010.

*Primary Examiner* — Pedro J Cuevas
(74) *Attorney, Agent, or Firm* — Carrier Blackman & Associates, P.C.; Joseph P. Carrier; William D. Blackman

(57) ABSTRACT

In a cogeneration system having at least with a generation unit comprising a generator connectable to an AC power feed line between a commercial power network and an electrical load, an internal combustion engine for driving the generator, and a battery, the cogeneration system producing hot air/water through exchange heat generated by the engine to supply to a thermal load, it is determined whether it is a predetermined self-diagnosis time, and when the result is affirmative, the generation unit is operated by an output of the battery and self-diagnoses is made on at least one of output voltage of the battery, a speed of the engine and an output of the generator, when it is determined to be the predetermined self-diagnosis time.

10 Claims, 3 Drawing Sheets

U.S. PATENT DOCUMENTS

| | | | | |
|---|---|---|---|---|
| 4,752,697 | A | 6/1988 | Lyons et al. | 290/2 |
| 4,817,418 | A * | 4/1989 | Asami et al. | 73/114.77 |
| 4,875,456 | A * | 10/1989 | Tomisawa | 123/585 |
| 4,884,054 | A * | 11/1989 | Moon, Sr. | 340/457.4 |
| 5,056,023 | A * | 10/1991 | Abe | 701/32 |
| 5,162,964 | A * | 11/1992 | Higasa et al. | 361/20 |
| 5,432,710 | A * | 7/1995 | Ishimaru et al. | 705/412 |
| 5,553,488 | A * | 9/1996 | Ishii et al. | 73/114.61 |
| 5,590,040 | A * | 12/1996 | Abe et al. | 701/35 |
| 5,696,676 | A * | 12/1997 | Takaba | 701/31 |
| 5,708,589 | A * | 1/1998 | Beauvais | 700/293 |
| 5,731,688 | A * | 3/1998 | Thomson | 322/22 |
| 5,734,255 | A * | 3/1998 | Thompson et al. | 322/7 |
| 5,778,006 | A * | 7/1998 | Mukai et al. | 714/733 |
| 5,844,603 | A * | 12/1998 | Ogata | 348/155 |
| 5,897,596 | A * | 4/1999 | Kabune et al. | 701/29 |
| 5,973,481 | A * | 10/1999 | Thompson et al. | 322/7 |
| 6,006,146 | A * | 12/1999 | Usui et al. | 701/29 |
| 6,067,009 | A * | 5/2000 | Hozuka et al. | 340/459 |
| 6,073,492 | A * | 6/2000 | Rosselson et al. | 73/644 |
| 6,112,150 | A * | 8/2000 | Irons et al. | 701/114 |
| 6,134,488 | A * | 10/2000 | Sasaki et al. | 701/31 |
| 6,170,323 | B1 * | 1/2001 | Enomoto et al. | 73/114.58 |
| 6,314,375 | B1 * | 11/2001 | Sasaki et al. | 702/34 |
| 6,320,497 | B1 * | 11/2001 | Fukumoto et al. | 340/425.5 |
| 6,370,586 | B2 * | 4/2002 | Davis et al. | 709/244 |
| 6,426,634 | B1 * | 7/2002 | Clunn et al. | 324/536 |
| 6,438,470 | B1 * | 8/2002 | Hiramatsu | 701/29 |
| 6,449,539 | B1 * | 9/2002 | Ohno et al. | 701/31 |
| 6,550,319 | B1 * | 4/2003 | Rutkowski et al. | 73/114.32 |
| 6,556,900 | B1 * | 4/2003 | Brynielsson | 701/29 |
| 6,650,977 | B2 * | 11/2003 | Miller | 701/29 |
| 6,754,579 | B2 * | 6/2004 | Kamiya et al. | 701/112 |
| 6,819,986 | B2 * | 11/2004 | Hong et al. | 701/29 |
| 6,832,151 | B2 * | 12/2004 | Kumazaki et al. | 701/112 |
| 6,838,781 | B2 * | 1/2005 | van de Loo | 290/40 B |
| 6,966,185 | B2 * | 11/2005 | Shimada et al. | 60/698 |
| 7,127,896 | B2 * | 10/2006 | Shimada et al. | 60/698 |
| 7,236,867 | B2 * | 6/2007 | Kumazawa et al. | 701/45 |
| 7,239,034 | B2 * | 7/2007 | Gehret, Jr. | 290/40 B |
| 7,242,311 | B2 * | 7/2007 | Hoff et al. | 340/679 |
| 7,319,926 | B2 * | 1/2008 | Suzuki | 701/31 |
| 7,400,953 | B2 * | 7/2008 | Fukui et al. | 701/29 |
| 7,409,275 | B2 * | 8/2008 | Sakurai et al. | 701/31 |
| 7,430,459 | B1 * | 9/2008 | Papalia et al. | 700/286 |
| 7,459,799 | B2 * | 12/2008 | Aldridge et al. | 290/2 |
| 7,566,848 | B2 * | 7/2009 | Takahashi | 219/494 |
| 7,580,781 | B2 * | 8/2009 | Mindeman | 701/29 |
| 7,615,878 | B2 * | 11/2009 | Shimizu et al. | 290/10 |
| 7,663,256 | B2 * | 2/2010 | Yuri et al. | 290/2 |
| 7,739,007 | B2 * | 6/2010 | Logsdon | 701/33 |
| 7,930,882 | B2 * | 4/2011 | Yuri | 60/320 |
| 7,970,527 | B2 * | 6/2011 | Nishi et al. | 701/113 |
| 8,004,099 | B2 * | 8/2011 | Yuri | 290/40 R |
| 2002/0046374 | A1 * | 4/2002 | Aoki et al. | 714/719 |
| 2002/0123833 | A1 * | 9/2002 | Sakurai et al. | 701/33 |
| 2002/0183904 | A1 * | 12/2002 | Sakurai et al. | 701/33 |
| 2003/0069673 | A1 * | 4/2003 | Hong et al. | 701/29 |
| 2003/0135321 | A1 * | 7/2003 | Kumazaki et al. | 701/112 |
| 2004/0107031 | A1 * | 6/2004 | Ichikawa et al. | 701/36 |
| 2004/0112663 | A1 * | 6/2004 | Kocher et al. | 180/274 |
| 2004/0243288 | A1 * | 12/2004 | Kito et al. | 701/29 |
| 2004/0267418 | A1 * | 12/2004 | Sakurai et al. | 701/33 |
| 2005/0119808 | A1 * | 6/2005 | Suzuki | 701/31 |
| 2006/0089768 | A1 * | 4/2006 | Sakurai et al. | 701/29 |
| 2006/0095197 | A1 * | 5/2006 | Nishi et al. | 701/113 |
| 2006/0289400 | A1 * | 12/2006 | Takahashi | 219/121.36 |
| 2007/0124039 | A1 * | 5/2007 | Sakurai et al. | 701/29 |
| 2008/0147136 | A1 * | 6/2008 | Zhou et al. | 607/7 |
| 2008/0180866 | A1 * | 7/2008 | Wong | 361/45 |
| 2009/0045625 | A1 * | 2/2009 | Yuri | 290/2 |
| 2009/0045626 | A1 * | 2/2009 | Yuri | 290/2 |
| 2009/0107128 | A1 * | 4/2009 | Yuri | 60/320 |
| 2009/0107129 | A1 * | 4/2009 | Yuri et al. | 60/320 |
| 2009/0108588 | A1 * | 4/2009 | Yuri et al. | 290/1 A |
| 2009/0127867 | A1 * | 5/2009 | Yuri | 290/40 R |
| 2009/0127868 | A1 * | 5/2009 | Yuri et al. | 290/40 R |
| 2009/0295157 | A1 * | 12/2009 | Yuri | 290/2 |
| 2009/0295158 | A1 * | 12/2009 | Yuri | 290/2 |
| 2010/0225496 | A1 * | 9/2010 | Hou et al. | 340/636.1 |
| 2010/0324962 | A1 * | 12/2010 | Nesler et al. | 705/8 |
| 2011/0047418 | A1 * | 2/2011 | Drees et al. | 714/57 |
| 2011/0061015 | A1 * | 3/2011 | Drees et al. | 715/771 |
| 2011/0126055 | A1 * | 5/2011 | Shimada et al. | 714/37 |
| 2011/0150162 | A1 * | 6/2011 | Hur et al. | 376/259 |
| 2011/0173497 | A1 * | 7/2011 | Nakatani et al. | 714/32 |
| 2011/0178612 | A1 * | 7/2011 | Nakatani et al. | 700/81 |
| 2011/0178977 | A1 * | 7/2011 | Drees | 706/52 |

* cited by examiner

COGENERATION SYSTEM

BACKGROUND OF THE INVENTION

1. Field of the Invention

This invention relates to a cogeneration system, particularly to a cogeneration system that self-diagnoses battery voltage and the like.

2. Description of the Related Art

In recent years, cogeneration systems have been developed that are equipped with an internal combustion engine-driven generator for installation in an AC power supply line between a commercial power network and an electrical load for supplying power to the electrical load in interconnection with the power network and also for supplying hot water or the like heated using exhaust heat from the engine to a thermal load. Among such the systems, there is known a type of a cogeneration system capable of self-diagnosing an abnormality, as taught, for example, by Japanese Laid-Open Patent Application No. Hei 1-237344.

In a technique disclosed in the prior art, an expert system using inference is introduced for self-diagnosing an abnormality of a cogeneration system.

A cogeneration system is continuously or intermittently operated in interconnection with the commercial power network at the time the power network works normally, while it is operated solely or independently when a failure such as a power outage occurs in the power network. Although the cogeneration system can start operating by being supplied with power from the power network when it is normal, the system has to start with power from a built-in battery when a failure such as a power outage occurs in the power network. In this case, if the battery has degraded, the system can not be started. The same can be applied when a failure happens in the engine.

SUMMARY OF THE INVENTION

An object of this invention is therefore to overcome the foregoing disadvantage by providing a cogeneration system equipped at least with a generation unit having a generator connectable to an AC power feed line between a commercial power network and an electrical load, an internal combustion engine for driving the generator and a battery, which can self-diagnose output voltage of the battery and the like.

In order to achieve the object, this invention provides, in a first aspect, a cogeneration system having at least with a generation unit comprising a generator connectable to an AC power feed line between a commercial power network and an electrical load, an internal combustion engine for driving the generator, a battery and a power controller, the cogeneration system producing hot air or water through exchange heat generated by the engine to supply to a thermal load, comprising: a self-diagnosis time determiner that determines whether it is a predetermined self-diagnosis time; and a self-diagnoser that operates the generation unit by an output of the battery and self-diagnoses on at least one of output voltage of the battery, a speed of the engine and an output of the generator, when it is determined to be the predetermined self-diagnosis time.

In order to achieve the object, this invention provides, in a first aspect, a method of self-diagnosing a cogeneration system having at least with a generation unit comprising a generator connectable to an AC power feed line between a commercial power network and an electrical load, an internal combustion engine for driving the generator, a battery and a power controller, the cogeneration system producing hot medium through exchange heat generated by the engine to supply to a thermal load, comprising the steps of: determining whether it is a predetermined self-diagnosis time; and operating the generation unit by an output of the battery and self-diagnosing on at least one of output voltage of the battery, a speed of the engine and an output of the generator, when it is determined to be the predetermined self-diagnosis time.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
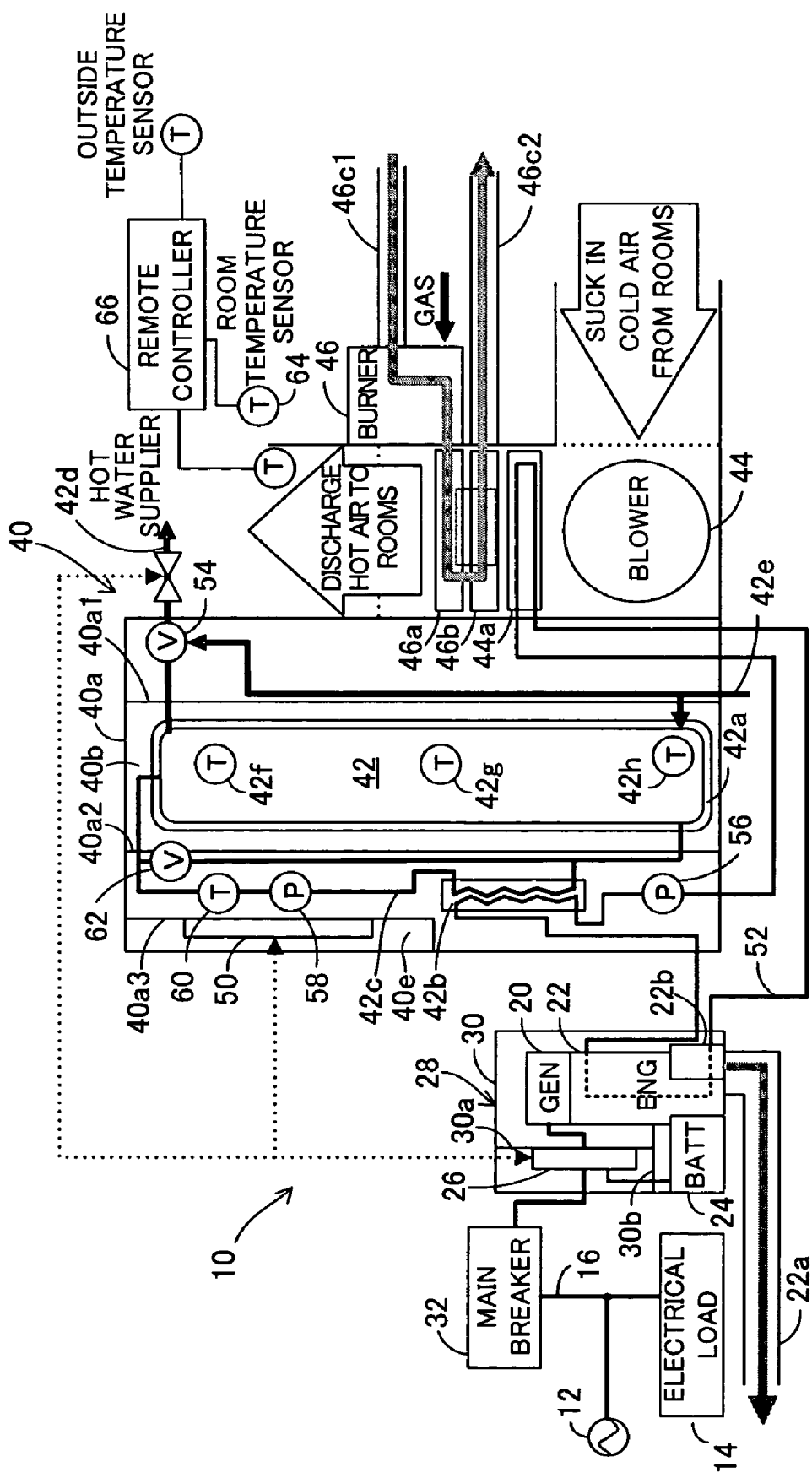
FIG. 1 is a block diagram giving an overall view of a cogeneration system according to an embodiment of this invention.

A cogeneration system according to an embodiment of the invention will now be explained with reference to the attached drawings.

As illustrated, the cogeneration system (designated by reference numeral 10) is equipped with a power generation unit 28 having a generator (GEN) 20 which can be connected to an AC power feed line (power line) 16 between a commercial power source (commercial power network) 12 and electrical loads 14, an internal combustion engine (ENG; hereinafter called "engine") 22 driving the generator 20, a battery (BATT) 24 and a power controller 26.

The power source 12 generates or outputs single-phase, three-wire, 100/200 V, 50 Hz (or 60 Hz) AC power. The battery 24 outputs 12 V DC rated voltage. The generation unit 28 is integrally formed and housed in a generation unit case 30.

Specifically, as shown in FIG. 1, the generation unit case 30 is divided into three compartments by partitions 30a, 30b. The right compartment in the drawing accommodates the generator 20 and engine 22 to be arranged above and below in a vertical direction in the axis of gravity, the upper left compartment accommodates the power controller 26 and the lower left compartment accommodates the battery 24. The power controller 26 is isolated from the engine 22, i.e., installed in one of the compartments which does not house the engine 22 so that heat from the engine 22 can be blocked as much as possible.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, the cylinder head and cylinder block of the engine 22 is laid in the lateral (horizontal) direction in the generation unit case 30, and a piston is reciprocatingly accommodated therein.

Intake air is supplied and mixed with gas. The produced air-fuel mixture flows into a combustion chamber and burns upon ignition to drive the piston, thereby rotating the crankshaft connected to the piston in a longitudinal (vertical) direction in the generation unit case 30. The generated exhaust gas passes through an exhaust pipe and an exhaust duct 22a connected to the generation unit case 30 and is discharged to the exterior. The engine 22 is installed with a pulsar coil (not shown) for detecting the speed of the engine 22.

A coolant circulation passage (explained later) is formed in the vicinity of heating region such as the cylinder block and the coolant composed of antifreeze liquid flows therethrough. The coolant exchanges heat with the heating region to rise its temperature, as cooling the engine 22, and passes through an exhaust-air heat exchanger 22b installed along the exhaust pipe to be further heated.

A flywheel attached to the upper end of the crankshaft has magnet pieces on the inside surface that are arranged to face multipolar coils constituting the generator 20. The generator 20 produces alternating current when the flywheel rotates such that the multipolar coils cross the flux emitted from the magnet pieces. The output of the generator 20 is sent to the power controller 26.

Figure 2:
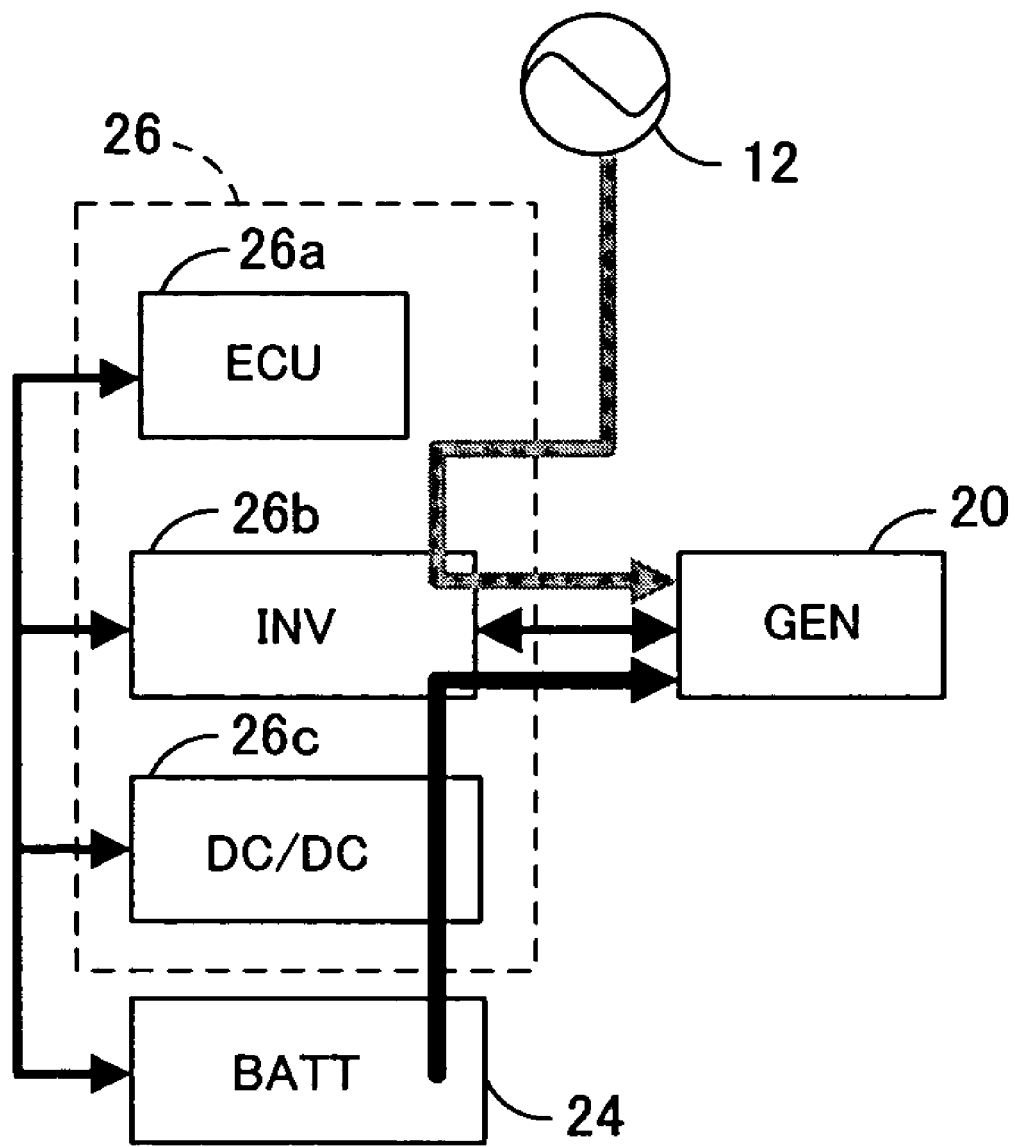
FIG. 2 is a block diagram showing connections of a generator with a power controller and other components shown in FIG. 1.

FIG. 2 is a block diagram showing connections of a generator 20 with a power controller 26 and other components shown in FIG. 1.

As illustrated, the power controller 26 comprises an electronic control unit (ECU) 26a constituted as a microcomputer, an inverter (INV) 26b and a DC/DC converter (DC/DC) 26c.

When the generator 20 is supplied with power from the power source 12 via the inverter 26b or from the battery 24 via the DC/DC converter 26c and inverter 26b, it functions as a starter motor for cranking the engine 22.

The ECU 26a switches the function of the generator 20 between the starter and the generator, and controls the operation of the engine 22 and the like. The battery 24 is installed with a voltage sensor (not shown) and an output thereof is sent to the ECU 26a.

The inverter 26b inverts the DC output of the DC/DC converter 26c to 100/200 V AC power (single phase). The output of power generation of the generation unit 28 is 1.0 kW or thereabout. The output of the inverter 26b is connected to the power feed line 16 via a main breaker 32.

The cogeneration system 10 includes a hot-water tank unit 40 in addition to the generation unit 28.

The hot-water tank unit 40 comprises a hot-water tank 42, a blower 44 for hot-air heating, a burner 46 and a hot-water tank unit controller 50. The hot-water tank unit 40 is housed in the hot-water tank unit case 40a. The hot-water tank unit case 40a is divided into four compartments by partitions 40a1, 40a2, 40a3. The hot-water tank 42 which is covered by a thermal insulator 42a and accommodated in a hot-water tank compartment 40b located at the center in FIG. 1, stores hot-water inside.

The explanation will be made in the following. The generation unit 24, hot-water tank 42 and blower 44 are connected through the above-mentioned coolant circulation passage (now assigned by 52). Specifically, the coolant circulation passage 52 extends from the engine 22 toward the hot-water tank unit 40, and locally positioned close to a hot-water-tank-side circulation passage 42c to form an exhaust heat exchanger 42b. In the exhaust heat exchanger 42b, the coolant flowing through the coolant circulation passage 52 is heat-exchanged with circulated water flowing through the hot-water-tank-side circulation passage 42c for being cooled.

The coolant circulation passage 52 is also connected to an exhaust heat exchanger 44a positioned near the blower 46, and returns to the engine 22. In the exhaust heat exchanger 44a, the coolant in the coolant circulation passage 52 is heat-exchanged with cold air sucked from a room(s) by the blower 44.

The water in the hot-water-tank-side circulation passage 42c warmed up by heat-exchange in the exhaust heat exchanger 42b goes in and out of the hot-water tank 42 so as to be circulated through the hot-water tank 42. The hot-water tank 42 is also provided with an outflow channel 42d that is connected to a heater's heat exchanger installed in each room, a hot-water supplier and a bathtub (none of which shown). The outflow channel 42d is connected via a mixing valve 54 with a water supply channel 42e from the water service to be able to regulate water temperature.

The burner 46 sucks in air from the exterior or outside by using a combustion fan and mixes the sucked air with supply gas to burn. The combustion gas thus generated passes through the sensible heat exchanger 46a and latent heat exchanger 46b and is discharged to the exterior. Reference numeral 46c1 indicates a burner intake pipe and 46c2 a burner exhaust pipe.

The sensible heat exchanger 46a and latent heat exchanger 46b warm up air passing through an air duct (not shown) of the blower 44 by the heat exchange. Specifically, the sensible heat exchanger 46a releases heat above the dew point of combustion gas and the latent heat exchanger 46b releases heat at or below the dew point. Condensate water generated in the latent heat exchanger 46b is discharged to the exterior through a drain pipe (not shown).

The blower 44 sucks in cold air from the rooms and supplies hot air which has been warmed up by the heat exchange by the exhaust heat exchanger 44a and further warmed up by combustion by the burner 46, to the rooms through the air duct for warming the rooms. The blower 44 and burner 46 are operated in interconnection with each other.

Thus the cogeneration system 10 according to this embodiment is configured to warm up the rooms by either one or both of hot-water supplied from the hot-water tank 42 and hot air supplied through the blower 44.

The hot-water tank unit controller (hot-water controller) 50 is housed in an isolation compartment 40e that is isolated from the other components by the partition 40a3. The hot-water controller 50 is equipped with an ECU (electronic control unit) constituted as a microcomputer similarly to the ECU 26a of the power controller 26. The ECU of the hot-air controller 50 is connected to the ECU 26a and a remote controller(s) (explained later) to be able to communicate.

Temperature sensors indicated by "T", valves by "V" and pumps by "P" in FIG. 1 are electrically connected to the hot-water controller 50, although signal lines are omitted in the drawing. Based on the outputs of the temperature sensors T, the hot-water controller 50 controls the operation of the valves V and pumps P to control the above-mentioned in and out operation of hot water of the hot-water tank 42 and the operation of the blower 44 and burner 46.

In other words, the hot-water controller 50 drives the exhaust-heat pump 56 to pump the coolant flowing through the coolant circulation passage 52 to the exhaust heat exchangers 42b, 44a for exchanging heat of circulating water in the hot-water-tank-side circulation passage 42c with the cold air of the rooms sucked in by the blower 44.

The circulating water in the hot-water-tank-side circulation passage 42c is pumped by a circulating pump 58 for circulating, while being warmed up by the heat exchange with the coolant flowing through the coolant circulation passage 52. When the water temperature detected by a temperature sensor 60 has reached a predetermined temperature (e.g., 70° C.), the hot-water controller 50 opens or closes a temperature regulating valve 62 to supply the water to the hot-water tank 42 from the upper portion thereof.

On the other hand, water whose temperature has decreased is discharged from the lower portion of the hot-water tank 42 and supplied to the hot-water-tank-side circulation passage 42c, thereby keeping the temperature of hot water in the hot-water tank 42 constant.

The operation of the hot-water controller 50 will be further explained.

First, the explanation is made on a case of operating the cogeneration system 10 in interconnection with the commercial power source 12.

(a) Hot-Water Operation

Based on outputs of three temperature sensors 42f, 42g, 42h disposed in the hot-water tank 42, the hot-water controller 50 detects water temperature distribution in the interior of the hot-water tank 42. When the detected temperature falls below a set temperature, the hot-water controller 50 sends a command to the ECU 26a of the power controller 26 to drive the engine 22 for warming up the coolant and, when it returns to the set temperature, terminates the operation of the engine 22.

Upon manipulation of a manual switch (not shown) by the user, the hot-water controller 50 operates such that much power is supplied to the commercial power source 12 regardless of the thermal condition in the hot-water tank 42.

(b) Heating Operation

The hot-water controller 50 compares the outputs of temperature sensors installed in the respective rooms (collectively assigned by 64) with the temperature set by the user through the remote controllers (installed in the respective rooms; collectively assigned by 66) and, when the detected temperature is lower than the set temperature, operates a heating pump (not shown) to supply hot water stored in the hot-water tank 42 through the outflow channel 42d to the heat exchangers installed in the rooms for warming the rooms.

The hot water exchanged heat with air in the room by the heat exchanger is returned to the lower portion of the hot-water tank 42. The remote controller 66 also functions as an indicator for indicating results of self-diagnosis, which will be explained later.

(c) Burner Operation

When the detected temperature does not reach the set temperature after a lapse of a specified time period or when a difference between the detected temperature and set temperature exceeds a predetermined value, the hot-water controller 50 determines that the operation only by supplying hot water is insufficient and operates the burner 46 to burn until reaching the set temperature for supplying hot-air warmed up by the burner 46 to the rooms by the blower 44.

(d) No Heating Requirement Case

When heating is not required, the hot-water controller 50 conducts the hot water operation. A rated thermal output Q of the generation unit 28 is calculated using the following equation.

$$Q = \{\text{Specific heat} \times \text{Specific gravity} \times (\text{Exhaust heat temperature} - \text{Supply water temperature}) \times \text{Exhaust heat flow rate}\}$$

Thus, when the interior of the hot-water tank 42 is thermally saturated, the hot-water controller 50 operates an exhaust heat valve (not shown) to release hot water at the above-mentioned exhaust heat temperature by an amount corresponding to the exhaust heat flow rate from the upper portion of the hot-water tank 42.

(e) Hot-Water Supplier/Bath

The hot-water controller 50 supplies hot water to a hot-water supplier or bathtub from the hot-water tank 42 in response to an instruction sent by the user through the remote controller 66, and opens or closes the mixing valve 54 to mix water supply into the hot water so as to achieve the instructed temperature. The hot-water controller 50 fills water by an amount of the used hot water from the lower portion of the hot-water tank 42 through the water supply channel 42e.

Next, the explanation is made on a case of independently operating the cogeneration system 10 separated from the commercial power source 12 when, for example, a power failure occurs in the power source 12.

In this case, the power controller 26 activates the generation unit 28 simultaneously with occurrence of a power failure. The ECU 26a of the power controller 26 operates the generation unit 28 to generate power corresponding to the electrical load 14. Since the voltage decreases with increasing electrical load and the voltage increases with decreasing electrical load, the ECU 26a regulates the power generation output so as to keep the voltage constant.

When the generation unit 28 is operated, including a period during idling operation with no power output, the thermal output is generated. The hot-water controller 50 conducts the hot-water operation, heating operation, burner operation and the like on thermal demand, similarly to the above-mentioned case of in interconnection with the commercial power source 12.

On the premise of the foregoing, self-diagnosis operation of the cogeneration system according to this embodiment will be explained.

Figure 3:
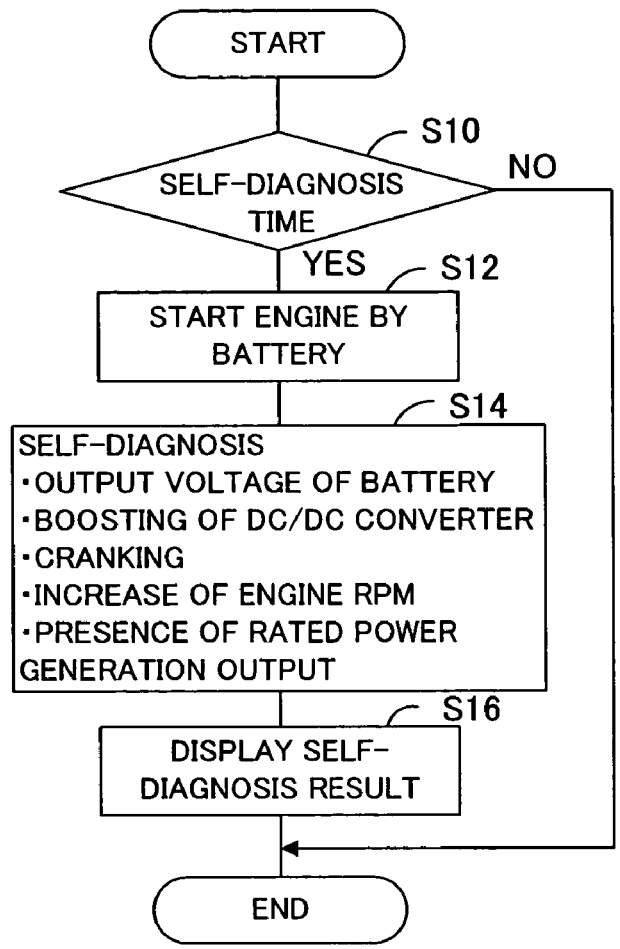
FIG. 3 is a flowchart showing self-diagnosis operation of the cogeneration system according to this invention.

FIG. 3 is a flowchart showing the operation. The shown program is executed by the ECU 26a of the power controller 26 only one time upon starting of the engine 22.

The explanation will be made. In S10, it is determined whether it is a time of self-diagnosing, i.e., a predetermined self-diagnosis time. Here, the predetermined self-diagnosis time is one from among a time when a predetermined time period has lapsed, a time when a number of operations of the generation unit has reached a predetermined number, and a time when a total operating time period of the generation unit has reached a predetermined time period.

The above predetermined time period is set as one month, for instance, for preventing aging degradation of the battery 24. Since the generation unit 28 is planned to be operated once or twice per one day, the above predetermined number is set as fifty times, for instance. The operating time period of the generation unit 28 is planned to be about four thousand hours per year and ten hours per day, so the above predetermined operation period is set, for example, as three hundred hours.

When the result in S10 is No, the remaining steps of the routine are skipped. When the result is Yes, the program proceeds to S12, in which the battery 24 is connected to the generator 20 so that the generator 20 functions as a starter for activating the engine 22.

Next, in S14, the self-diagnosis is conducted. The self-diagnosis is conducted at least on output voltage of the battery 24, precisely, at least on one of the output voltage of the battery 24, speed of the engine 22 and an output of the generator 20.

More specifically, the self-diagnosis is conducted by checking for the output voltage of the battery 24, boosting of the DC/DC converter 26c, cranking of the engine 22, increase of the engine speed and the presence of a rated power generation output.

Figure 4:
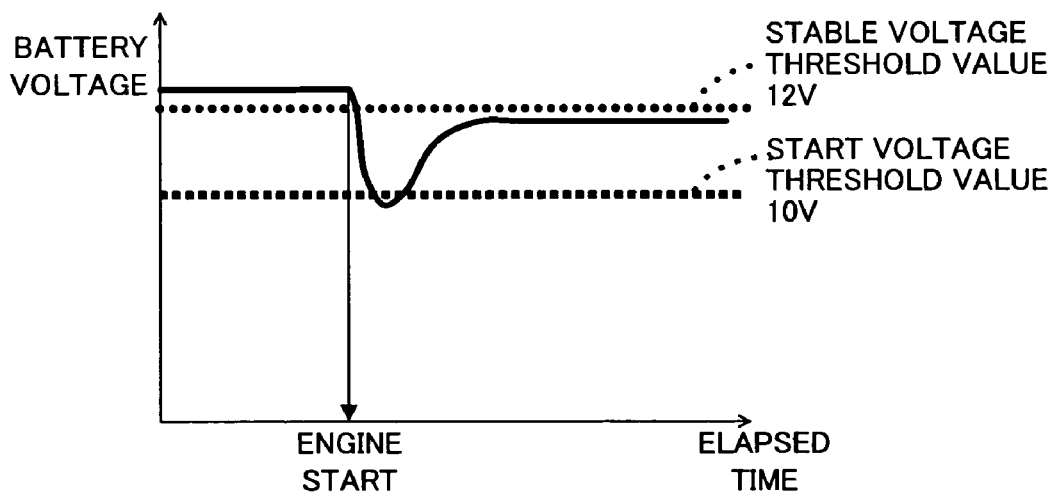
FIG. 4 is a graph showing the characteristics of output voltage of a battery, which is used for self-diagnosing the output voltage of the battery shown in the flowchart of FIG. 3.

Among the forgoing items, the output voltage of the battery 24 is checked in accordance with the characteristics shown in FIG. 4. Specifically, when the minimum voltage of the battery 24 at engine starting detected by the voltage sensor is lower than a threshold value for start voltage (e.g., 10 V) or when the voltage after engine starting is lower than a threshold value for stable voltage (e.g., 12 V), it is discriminated that a function of the battery 24 is degraded.

The boosting of the DC/DC converter 26c is checked by discriminating whether its output has reached a predetermined voltage. The cranking of the engine 22 and increase of the engine speed are checked by detecting the engine rotation at starting of the engine 22 by the pulsar coil. The presence of the rated power generation output is checked by discriminating the output of the generator 20.

Then the program proceeds to S16, in which a result of the self-diagnosis made in S14 is displayed on the remote controller 66.

Specifically, when no problem is found in the self-diagnosis, an indication of "Normal" appears and when a problem is found, e.g., when a function of the battery 24 has been discriminated to be degraded, an indication to that effect appears for informing of the user to replace the battery 24. This procedure is similarly conducted with respect to the other points to be checked.

As stated in the foregoing, this embodiment is configured to have a cogeneration system (10) having at least with a generation unit (26) comprising a generator (20) connectable to an AC power feed line (power line) 16 between a commercial power network (commercial power source) 12 and an electrical load (14), an internal combustion engine (22) for driving the generator, a battery (24) and a power controller (26), the cogeneration system producing hot air or water through exchange heat generated by the engine to supply to a thermal load (hot-water tank 42, rooms), comprising: a self-diagnosis time determiner (ECU 26a of the power controller 26, S10) that determines whether it is a predetermined self-diagnosis time; and a self-diagnoser (ECU 26a of the power controller 26, S12 to S14) that operates the generation unit (28) by an output of the battery (24) and self-diagnoses on at least one of output voltage of the battery (24), a speed of the engine (22) and an output of the generator (20), when it is determined to be the predetermined self-diagnosis time.

Owing to this configuration, it becomes possible to periodically check whether the battery 24 is degraded or an abnormality occurs in the engine 22 or generator 20, thereby enabling to operate the cogeneration system 10 without trouble in the case, for example, where a failure, such as a power outage, occurs in the commercial power source 12.

In the system, the predetermined self-diagnosis time is one from among a time when a predetermined time period has lapsed, a time when a number of operations of the generation unit has reached a predetermined number, and a time when a total operating time period of the generation unit has reached a predetermined time period. With this, in addition to the foregoing effect, it becomes possible to prevent the time of self-diagnosis from being missed.

The system further includes: an indicator that indicates a result of self-diagnosis by the self-diagnoser. With this, in addition to the foregoing effects, the self-diagnosis result can be reliably informed to the user for urging the user to replace the battery 24 or the like, thereby enabling to operate the cogeneration system without trouble in the case, for example, where a failure occurs in the commercial power source 12.

It should be noted that, in the foregoing although a gas engine using gas fuel such as the city gas or LP (liquefied petroleum) gas is taken as an example of the power source of the generator 20, an engine instead can be one utilizing gasoline fuel or the like.

It should also be noted that, although the output of the generator 20, displacement of the engine 22 and the like are shown by specific values, they are only examples and not limited thereto.

Japanese Patent Application No. 2007-212981 filed on Aug. 17, 2007, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having at least a generation unit-including a generator connectable to an AC power feed line between a commercial power network and an electrical load, an internal combustion engine for driving the generator, a battery and a power controller, the cogeneration system producing hot air or water through heat exchange with the engine to supply to a thermal load, comprising:
   a self-diagnosis process configured to:
      determine whether it is a predetermined self-diagnosis time;
      start the engine by an output of the battery when it is determined to be the predetermined self-diagnosis time; and
      self-diagnose on an output voltage of the battery, a speed of the engine, an output of the generator, boosting of a converter of the power controller and cranking of the engine.

2. The system according to claim 1, wherein the predetermined self-diagnosis time is one from among a time when a predetermined time period has lapsed, a time when a number of operations of the generation unit has reached a predetermined number, and a time when a total operating time period of the generation unit has reached a predetermined time period.

3. The system according to claim 1, further including:
   an indicator that indicates a result of the self-diagnosis process.

4. The system according to claim 2, further including:
   an indicator that indicates a result of the self-diagnosis process.

5. The system according to claim 1, wherein the self-diagnosis process is further configured to:
   compare the output voltage of the battery at a plurality of comparison times including at least an engine starting time and a second time subsequent to the engine starting time respectively to a starting voltage threshold value and a stable voltage threshold value; and
   determine that the battery is degraded when the output voltage of the battery is less than one of the starting voltage threshold value and the stable voltage threshold value at the respective comparison times.

6. A method of self-diagnosing a cogeneration system having at least a generation unit including a generator connectable to an AC power feed line between a commercial power network and an electrical load, an internal combustion engine for driving the generator, a battery and a power controller, the cogeneration system producing hot medium through heat exchange with the engine to supply to a thermal load, comprising the steps of:
   determining whether it is a predetermined self-diagnosis time; and starting the engine by an output of the battery when it is determined to be the predetermined self-diagnosis time; and self-diagnosing on an output voltage of the battery, a speed of the engine, an output of the generator, boosting of a converter of the power controller and cranking of the engine.

7. The method according to claim 6, wherein the predetermined self-diagnosis time is one from among a time when a predetermined time period has lapsed, a time when a number of operations of the generation unit has reached a predetermined number, and a time when a total operating time period of the generation unit has reached a predetermined time period.

8. The method according to claim 6, further including the step of:

indicating a result of self-diagnosis by the step of self-diagnosing.

9. The method according to claim 7, further including:

indicating a result of self-diagnosis by the step of self-diagnosing.

10. The method according to claim 6, further comprising:

comparing the output voltage of the battery at a plurality of comparison times including at least an engine starting time and a second time subsequent to the engine starting time respectively to a starting voltage threshold value and a stable voltage threshold value; and determining that the battery is degraded when the output voltage of the battery is less than one of the starting voltage threshold value and the stable voltage threshold value at the respective comparison times.

* * * * *